United States Patent
Veine et al.

(10) Patent No.: US 8,376,465 B2
(45) Date of Patent: Feb. 19, 2013

(54) ADJUSTABLE HEAD RESTRAINT ASSEMBLY FOR VEHICLE SEATS

(75) Inventors: Eric Veine, Wixom, MI (US); Arjun Yetukuri, Rochester Hills, MI (US); Mladen Humer, West Bloomfield, MI (US); Marc Poulin, Chesterfield, MI (US); Gerald S. Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 372 days.

(21) Appl. No.: 12/782,988

(22) Filed: May 19, 2010

(65) Prior Publication Data

US 2011/0006578 A1 Jan. 13, 2011

Related U.S. Application Data

(60) Provisional application No. 61/223,462, filed on Jul. 7, 2009.

(51) Int. Cl.
*B60N 2/48* (2006.01)

(52) U.S. Cl. ............................................. 297/410
(58) Field of Classification Search .................. 297/410
See application file for complete search history.

(56) References Cited

U.S. PATENT DOCUMENTS

| 3,563,602 A | 2/1971 | Ohta |
| 3,572,831 A | 3/1971 | Barecki et al. |
| 4,671,573 A | 6/1987 | Nemoto et al. |
| 4,779,929 A | 10/1988 | Kuchemann |
| 5,895,094 A | 4/1999 | Mori et al. |
| 6,068,337 A | 5/2000 | De Filippo |
| 6,361,113 B2 * | 3/2002 | Heilig ............................ 297/410 |
| 6,880,891 B2 * | 4/2005 | Yetukuri et al. ............... 297/410 |
| 6,899,395 B2 * | 5/2005 | Yetukuri et al. .......... 297/410 X |
| 7,108,327 B2 | 9/2006 | Locke et al. |
| 7,137,668 B2 | 11/2006 | Kreitler |
| 7,306,287 B2 | 12/2007 | Linardi et al. |
| 7,316,455 B2 | 1/2008 | Metz et al. |
| 7,407,231 B2 | 8/2008 | Kraft et al. |
| 7,562,936 B1 | 7/2009 | Veine et al. |
| 7,758,127 B2 * | 7/2010 | Bokelmann et al. .......... 297/410 |
| 7,878,597 B2 * | 2/2011 | Bokelmann et al. .......... 297/410 |
| 2006/0186720 A1 | 8/2006 | Linardi et al. |
| 2006/0250017 A1 * | 11/2006 | Otto et al. ..................... 297/410 |
| 2006/0261661 A1 | 11/2006 | Kraft et al. |

FOREIGN PATENT DOCUMENTS

| CN | 1761591 A | 4/2006 |
| DE | 19648321 A1 | 6/1997 |
| DE | 19603911 A1 | 8/1997 |
| DE | 19714283 A1 | 11/1997 |

(Continued)

OTHER PUBLICATIONS

German Office Action for corresponding Application No. 10 2010 030 783.1, mailed Dec. 8, 2011, 5 pages.

(Continued)

*Primary Examiner* — Rodney B White
(74) *Attorney, Agent, or Firm* — Brooks Kushman P.C.

(57) ABSTRACT

An adjustable head restraint assembly for a vehicle seat is provided with a pair of shells. Each shell is sized to mate with the other and collectively retain a pair of posts therebetween. A frame adapted to mate with the pair of shells for retaining the pair of shells upon the pair of posts. A locking mechanism is provided on at least one of the frame and the pair of shells for locking the pair of shells and the frame to the pair of posts, and for permitting adjustment of the pair of shells and the frame along the posts.

20 Claims, 4 Drawing Sheets

FOREIGN PATENT DOCUMENTS

| | | |
|---|---|---|
| DE | 19632560 A1 | 2/1998 |
| DE | 10312517 A1 | 10/2004 |
| DE | 102005043811 A1 | 5/2006 |
| DE | 102005020276 B3 | 9/2006 |
| EP | 0267503 A2 | 10/1987 |
| EP | 0965481 A1 | 12/1999 |
| EP | 0965482 A1 | 12/1999 |
| EP | 0970846 A1 | 1/2000 |
| GB | 2240920 A | 8/1991 |
| WO | 03059683 A1 | 7/2003 |

OTHER PUBLICATIONS

China Office Action for corresponding Application No. 201010219940.1, mailed Jul. 2, 2012, 9 pages.

* cited by examiner

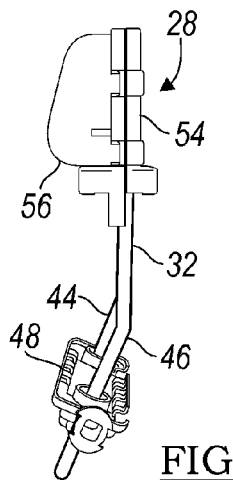 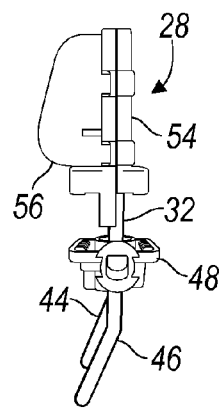 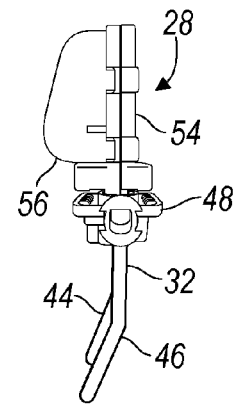
FIG. 8   FIG. 9   FIG. 10
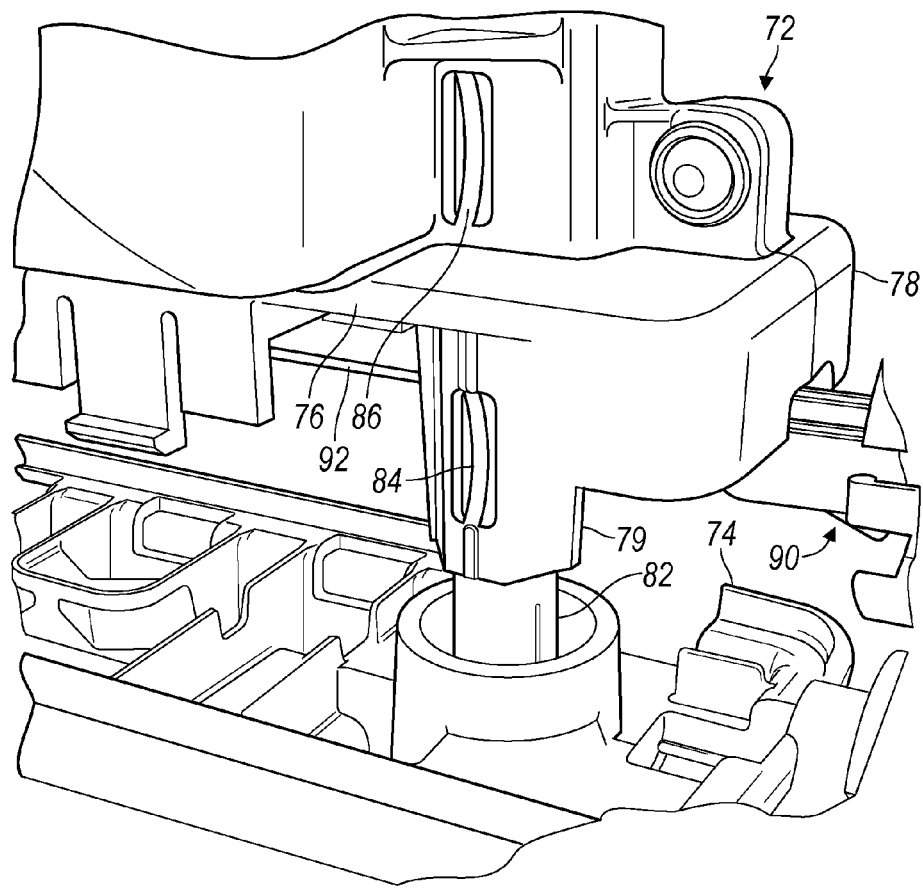
FIG. 11

ADJUSTABLE HEAD RESTRAINT ASSEMBLY FOR VEHICLE SEATS

CROSS-REFERENCE TO RELATED APPLICATIONS

This application claims the benefit of U.S. provisional Application No. 61/223,462 filed Jul. 7, 2009, the disclosure of which is incorporated in its entirety by reference herein.

TECHNICAL FIELD

Various embodiments relate to adjustable head restraint assemblies for vehicle seats.

BRIEF DESCRIPTION OF THE DRAWINGS

FIG. 8 is another exploded perspective view of the head restraint assembly of FIG. 1, illustrating a manufacturing step;

FIG. 9 is another exploded perspective view of the head restraint assembly of FIG. 1, illustrating another manufacturing step;

FIG. 10 is a perspective view of the head restraint assembly of FIG. 1, illustrating another manufacturing step;

FIG. 11 is an enlarged exploded perspective view of a head restraint assembly according to another embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
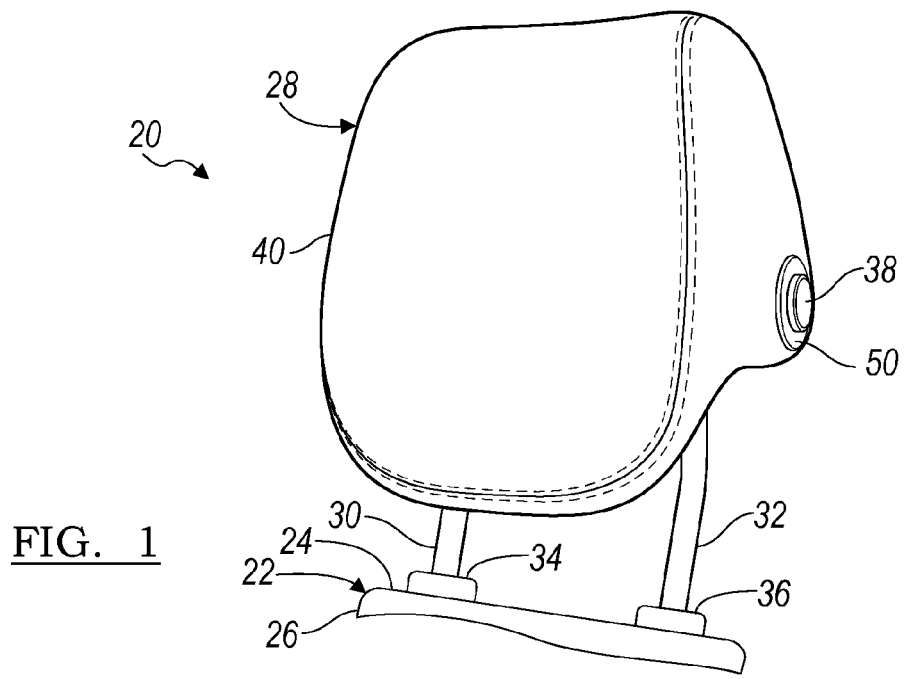
FIG. 1 is a perspective view of an adjustable head restraint assembly for a vehicle seat according to an embodiment.

With reference now to FIG. 1, a vehicle seat is partially illustrated and referenced generally by numeral 20 for use in a vehicle, such as an automobile, a water craft or an air craft. The seat 20 includes a seat bottom (not shown) that is mounted within the vehicle. The seat 20 also includes a seat back 22 that is mounted to one of the seat bottom of the vehicle. The seat back 22 is illustrated without cushioning or a cover for revealing a frame 24.

The vehicle seat 20 may be provided anywhere within an associated vehicle, such as a front row seat, an intermediate row seat, a rear row seat, or the like. The seat bottom may be mounted directly to the vehicle floor or coupled to seat adjuster mechanisms or rails extending longitudinally to the vehicle floor and enabling longitudinal, height, and angular adjustment of the seat bottom relative to the vehicle floor.

The frame 24 is formed from any suitable material that is efficiently light in weight, yet structurally sound for supporting the occupant and for withstanding appropriate testing requirements. The frame 24 includes an upper cross member 26.

A head restraint assembly 28 is provided in the vehicle proximate to the seat back 22 for supporting a head of the occupant. The head restraint assembly 28 is adjustable in height and utilizes a reduction in components, while providing common components for various designs, as will be discussed below.

In the embodiment depicted, the head restraint assembly 28 includes a pair of posts 30, 32 that are secured to the frame 24. The posts 30, 32 may each be received in a corresponding sleeve 34, 36 that is mounted to the cross member 26 of the frame 24. The posts 30, 32 may be secured to the sleeves 34, 36 by a suitable fastener such as a retaining ring. Although the posts 30, 32 are illustrated mounted to the frame 24, the invention contemplates that the posts 30, 32 may be secured to any structure of the vehicle body for orienting the head restraint assembly 28 proximate to the seat back 22. For example, the head restraint assembly 28 may be secured to the seat back 22 for various seating arrangements such as front row seating, intermediate seating, and rear row seating. In another example, the posts 30, 32 may be mounted to a component, such as an armature, of an active head restraint system. However, in certain seating arrangements, the head restraint assembly 28 may be mounted directly to the vehicle body, such as a rear row seating that is adjacent to a cargo compartment, or single row seating vehicles. Alternatively, the head restraint assembly 28 can be mounted to a pair of posts 30, 32 extending from an armature of an active head restraint system.

The head restraint assembly 28 is a height adjustable head restraint assembly that is adjustable along the posts 30, 32. The head restraint assembly 28 includes an external push button 38 for permitting height adjustment of head restraint assembly 28. The push button 38 extends from a side of an external cover 40 of the head restraint assembly 28. Thus, a locking mechanism for locking a height position of the head restraint assembly 28 is retained within the head restraint assembly 28, as opposed to being provided on the seat back 22.

Figure 2:
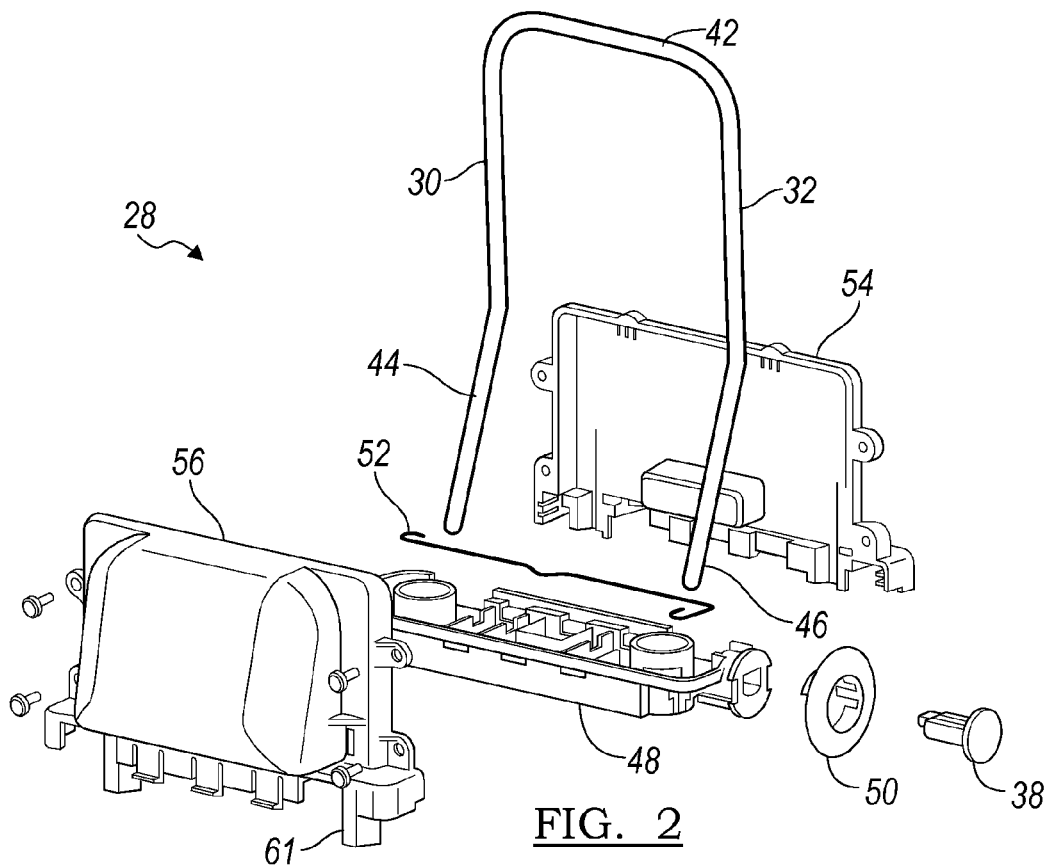
FIG. 2 is an exploded perspective view of the head restraint assembly of FIG. 1.

FIG. 2 illustrates the head restraint assembly 28 exploded, with the cover 40 removed and underlying padding or cushioning (not shown) removed for revealing the operational components. The posts 30, 32 are formed integrally as a continuous rod that includes an intermediate transverse portion 42 connecting the upper ends of the posts 30, 32. Additionally, each of the posts 30, 32 includes a lower portion 44, 46 that is angled offset in a forward direction at the lower end of the posts 30, 32. The angled lower portions 44, 46 of the posts 30, 32 are provided to match the offset from vertical of the seat back 22 so that the posts 30, 32 extend generally vertical relative to the seat back 22. Although angled portions 44, 46 are illustrated, the invention contemplates utilization of straight posts.

The head restraint assembly 28 includes a lower transverse frame 48. The frame 48 supports a bezel 50, which may be on the exterior, and the push button 38. The push button 38 is retained within the transverse frame 48 for limited linear movement relative to the frame 48 as a result of being depressed by the user. A spring 52 is retained within the lower frame 48 for being actuated by the push button 38 and for engaging notches (not shown) in the posts 30, 32. Depression of the push button 38 unlocks the head restraint assembly 28 by disengaging the spring 52 for height adjustment along the posts 30, 32 and release of a manual force upon the push button 38 returns the spring 52 into a locking engagement with the notches in the posts 30, 32. This locking mechanism is illustrated and described in greater detail in U.S. Pat. No. 7,562,936 B1 filed on Aug. 29, 2008, which is incorporated by reference herein.

The head restraint assembly 28 includes a rear shell 54 and a front shell 56 that collectively mate to retain the posts 30, 32 therebetween. Once assembled, the transverse frame 48 is assembled to the shells 54, 56 to collectively provide the operational components of the head restraint assembly 28.

Figure 3:
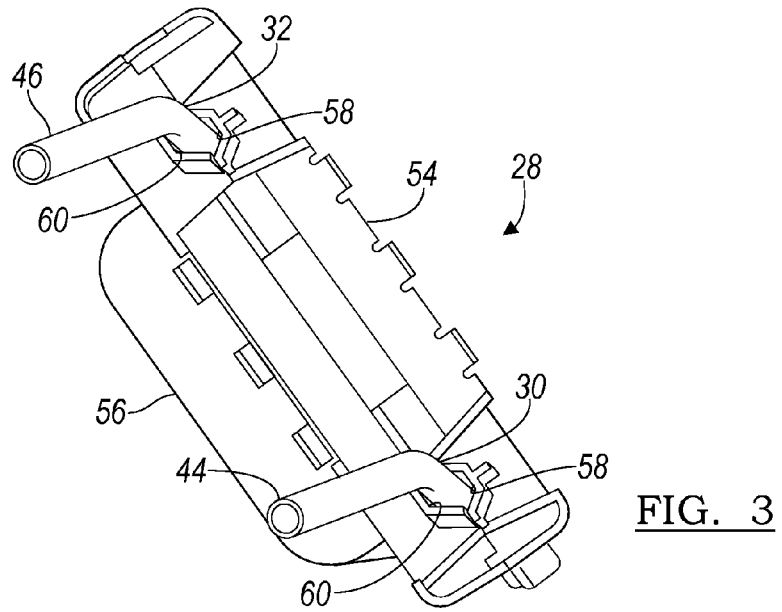
FIG. 3 is a bottom perspective view of the head restraint assembly of FIG. 1, illustrated partially assembled.

Referring now to FIG. 3, each of the shells 54, 56 includes a pair of recesses 58, 60, which are sized to collectively receive the posts 30, 32 therein for providing a guide of the head restraint assembly 28 along the posts 30, 32. Each of the recesses 58, 60 has a plurality of flats for receiving one of the corresponding posts 30, 32. In FIG. 2, a pair of flexible extensions 61 are illustrated that engage the posts 30, 32 to apply a pressure on the posts 30, 32 for compliancy in the engagement and uniform translation of the head restraint assembly 28. The outside diameter of the posts 30, 32 is greater than a mating feature of the flexible extensions 61 in order to depress the extensions 61. Although extensions 61 are illustrated and described, any flexible member of any various geometric shape is contemplated.

Figure 4:
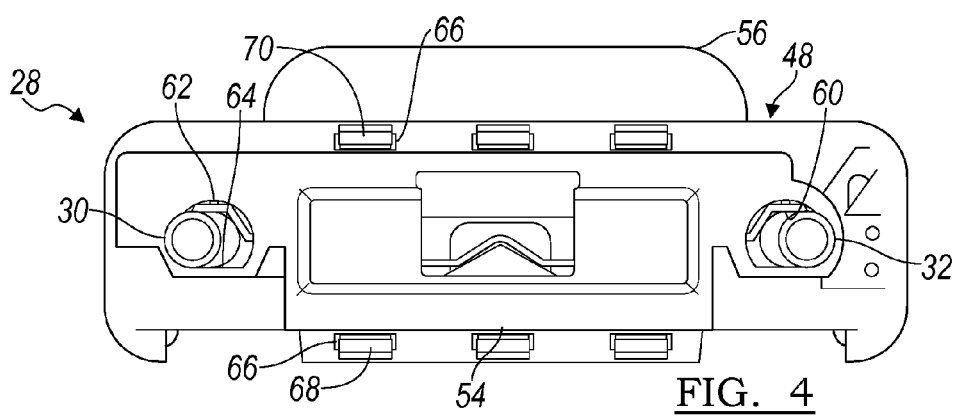
FIG. 4 is a bottom perspective view of the head restraint assembly of FIG. 1, illustrated further assembled.

Referring now to FIG. 4, the transverse frame 48 includes a pair of apertures 62 that are aligned with the recesses 58 (FIG. 3), 60 of the shells 54, 56 for permitting the posts 30, 32 to pass therethrough. The apertures 62 are oversized relative to the posts 30, 32 for providing clearance and for receiving posts of varying outside diameters. The frame apertures 62 are provided with a flat portion 64 for providing a common surface for engaging the posts 30, 32 and for engaging posts of varying diameters.

Figures 5, 6, 7:
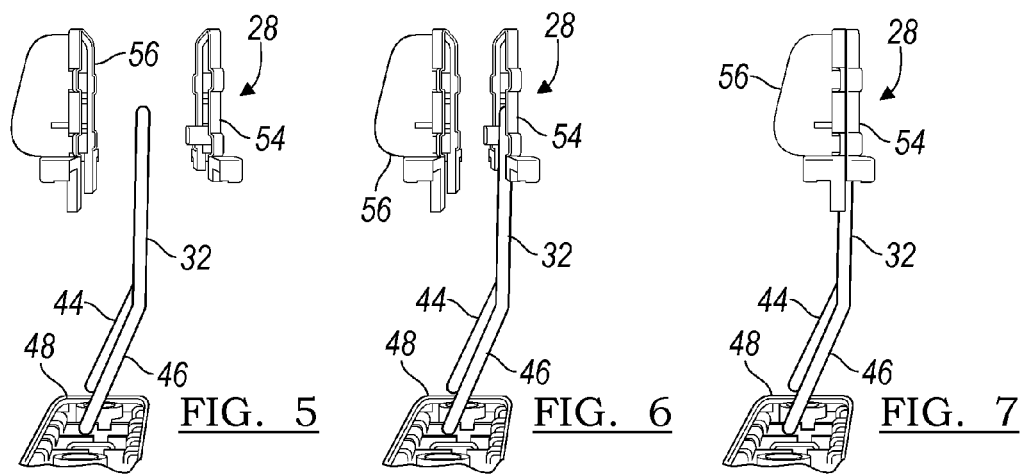
FIG. 5 is an exploded side perspective view of the head restraint assembly of FIG. 1.
FIG. 6 is another exploded perspective view of the head restraint assembly of FIG. 1, illustrating a manufacturing step.
FIG. 7 is another exploded perspective view of the head restraint assembly of FIG. 1, illustrating another manufacturing step.

Beginning with FIG. 5, the head restraint assembly 28 is assembled by receiving the posts 30, 32 within the rear shell 54 as illustrated in FIG. 6. The front shell 56 is assembled to the rear shell 54 by mating the two shells 54, 56 together in FIG. 7. Consequently, the shells 54, 56 are fastened together by any suitable fastener component or method, such as clips upon the shells 54, 56, an adhesive, mechanical fasteners, sonic welding, heat staking or the like.

In FIG. 8, the transverse frame 48 is placed upon the lower portions 44, 46 of the posts 30, 32. Due to the oversize of the apertures 62, the transverse frame 48 can be assembled by sliding it past the angled portions 44, 46 of the posts 30, 32. This feature permits the posts 30, 32 to be completely manufactured prior to assembly. In other words, the posts 30, 32 do not have to be bent after the transverse frame 48 is assembled to the posts 30, 32.

Then, in FIGS. 9 and 10, the frame 48 is assembled to the shells 54, 56. Referring again to FIG. 4, the frame 48 may include a series of slots 66 for receiving locking tabs 68, 70 from the shells 54, 56.

In prior art head restraints, a pair of separate posts are provided. An integral rod is not employed in the prior art because the prior art frames are not configured to be assembled over the bent portions of the posts. Therefore, by employing separate posts, the frame can be inserted over the top straight ends of a pair of posts. These shortcomings of the prior art result in utilization of extra components. By sizing the frame 48 to be assembled over the angled portions 44, 46 of the posts 30, 32 of the depicted embodiment, a unitary, continuous rod can be employed thereby reducing parts, simplifying manufacturing procedures, and reducing costs.

The adjustable head restraint assembly 28 provides height adjustment of the head restraint assembly 28 relative to the seat back 22. This adjustment is provided with a minimal number of components thereby reducing cost and weight of the head restraint assembly 28, while optimizing reliability of the head restraint assembly 28.

Often, various vehicle seats require posts 30, 32 with varying outside diameters. The frame 48 is designed with apertures 62 sized to accommodate the typical range of the outside diameters of posts 30, 32. Thus, the adjustable head restraint assembly 28 design provides commonality for the frame 48 and locking mechanism for various seat designs. Thus, the adjustable head restraint assembly 28 may be utilized for various seat designs, by using the lower frame 48, the locking mechanism, and the rear shell 54, while providing a front shell 56 that is designed with recesses 60 specific for that vehicle seat. Thus, the adjustable head restraint assembly 28 provides a commonality of parts for various vehicle seats thereby reducing costs.

Figure 12:
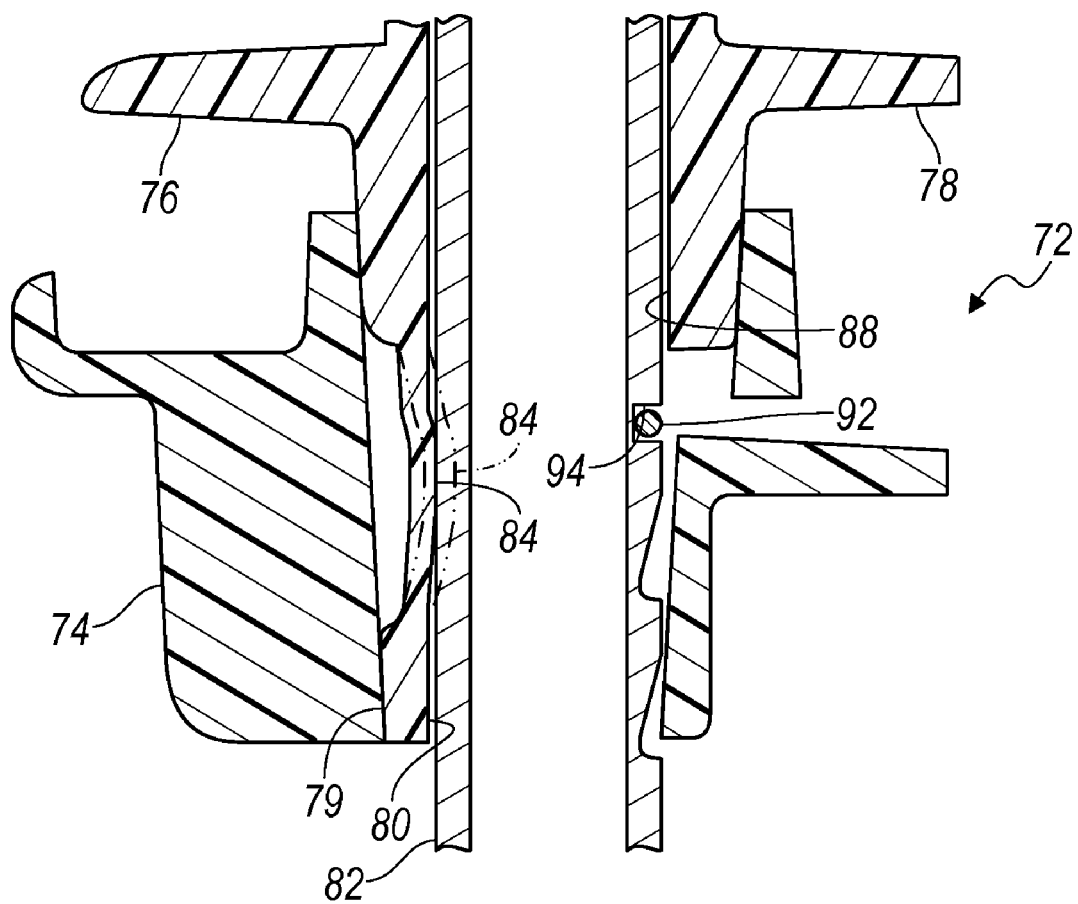
FIG. 12 is an enlarged section view of the head restraint assembly of FIG. 11.

FIGS. 11 and 12 illustrate a head restraint assembly 72 according to another embodiment. Similar to the prior embodiment, the head restraint assembly 72 includes a transverse frame 74 for engaging a front shell 76 and a rear shell 78. The front shell 76 includes an upright guide support 79 with a recess 80 for receiving a post 82. The guide support 79 includes a pair of flexible projections 84, 86, which project into the recess 80 in an unloaded position. The unloaded position for the lower projection 84 is illustrated in phantom in FIG. 12. The post 82 has a diameter that exceeds a dimension from a recess 88 in the rear shell 78 to the flexible projections 84, 86 in the front shell 76. Upon insertion of the post 82 into the recesses 80, 88, the flexible projections 84, 86 are deflected to a loaded position as illustrated in solid in FIG. 12. The loading of the flexible projections 84, 86 provides a constant pressure upon the post 82 for resistance upon the post 82. Of course, flexible projections may also be provided on another guide support for engaging another post.

Manual actuation of a locking mechanism 90 disengages an elongate spring 92 from a notch 94 in the post 82, thereby permitting adjustment of the head restraint assembly 72 along the post 82, or a pair of posts. The flexible projections 84, 86 provide resistance for a smooth transition during translation of the head restraint assembly 72 along the post 82.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed is:

1. An adjustable head restraint assembly for a vehicle seat comprising:
   a pair of shells, each sized to mate with one another and collectively retain a pair of posts therebetween;
   a frame for retaining the pair of shells upon the pair of posts;
   a locking mechanism provided on at least one of the frame and the pair of shells for locking the pair of shells and the frame to the pair of posts, and for permitting adjustment of the pair of shells and the frame along the posts; and at least one flexible member mounted to at least one of the pair of shells and the frame to engage one of the pair of posts to apply pressure for compliancy in the engagement and uniform translation of the head restraint assembly.

2. The adjustable head restraint assembly of claim 1 wherein the at least one flexible member extends from one of the shells.

3. The adjustable head restraint assembly of claim 1 wherein the at least one flexible member has a mating feature for mating with the post that is less than an outside diameter of the post for depression of the flexible member upon assembly.

4. The adjustable head restraint assembly of claim 1 further comprising:

cushioning provided on at least one of the pair of the shells and the frame; and a cover provided over the cushioning, the pair of shells, and the frame.

5. The adjustable head restraint assembly of claim 1 wherein the pair of shells comprise:

a front shell; and a rear shell.

6. The adjustable head restraint assembly of claim 1 wherein the frame is mounted to a lower end of the pair of shells; and wherein the frame has a pair of apertures formed therethrough for permitting the pair of posts to extend therethrough, the apertures being sized to provide clearance to the pair of posts and to receive posts of varying diameters.

7. The adjustable head restraint assembly of claim 6 wherein the pair of apertures formed through the frame each include a flat portion for providing a common surface for engaging the posts and for engaging posts of varying diameters.

8. The adjustable head restraint assembly of claim 1 wherein the pair of shells each include a mating surface for mating with the other shell and a pair of recesses aligned with the pair of recesses of the other shell for collectively retaining the posts therein.

9. The adjustable head restraint assembly of claim 8 wherein at least one of the recesses has a plurality of flats for receiving the post.

10. The adjustable head restraint assembly of claim 1 further comprising a pair of posts extending into the shells and cooperating with the locking mechanism.

11. The adjustable head restraint assembly of claim 1 wherein the locking mechanism is provided on the frame.

12. The adjustable head restraint assembly of claim 1 wherein the locking mechanism comprises:

an elongate spring mounted to the frame in engagement with notches on at least one of the pair of posts;

an actuator mounted on the frame in engagement with the elongate spring such that movement of the actuator actuates the elongate spring out of engagement with the notches on the at least one of the pair of posts.

13. A vehicle seat assembly comprising:

a seat bottom adapted to be mounted to a vehicle body;

a seat back extending from the seat bottom;

a pair of posts adapted to be mounted to a vehicle body for extending proximate to a top of the seat back; and an adjustable head restraint assembly according to claim 1 mounted to the pair of posts.

14. A method for assembling an adjustable head restraint assembly comprising steps of:

providing a pair of posts for supporting a head restraint assembly;

mounting a first shell upon the pair of posts;

mounting a second shell upon the pair of posts in engagement with the first shell for retaining the pair of posts therebetween for adjustment of the first and second shells along the pair of posts;

inserting the posts through a pair of apertures on a frame;

sliding a frame along the posts into engagement with at least one of the shells; and providing the pair of aperture in the frame oversized relative to the posts for accommodating posts of varying diameters.

15. The method of claim 14 further comprising steps of:

providing the pair of posts integrally from a continuous rod;

providing the pair of posts each with a bend therein prior to assembly, for offsetting a direction of adjustment from an incline of an associated seat back; and providing the pair of apertures in the frame oversized relative to the posts for sliding past the bends in the posts.

16. The method of claim 14 further comprising a step of fastening the frame to the first and second shells.

17. The method of claim 14 further comprising steps of:

providing fasteners on the first and second shells; and providing corresponding fasteners on the frame for fastening the frame to the first and second shells.

18. The adjustable head restraint assembly of claim 1 further comprising a pair of posts;

wherein the pair of shells comprises a front shell having a mating surface and a pair of recesses for engaging the pair of posts; and wherein the pair of shell further comprises a rear shell having a mating surface for mating with the front shell and a pair of recesses aligned with the pair of recesses in the front shell to collectively retain the pair of posts therebetween.

19. The adjustable head restraint assembly of claim 1 wherein the frame is adapted to mate with the pair of shells.

20. An adjustable head restraint assembly for a vehicle seat comprising:

a pair of shells, each sized to mate with one another and collectively retain a pair of posts therebetween;

a frame adapted to mate with at least one of the pair of shells for retaining the pair of shells upon the pair of posts; and a locking mechanism provided on at least one of the frame and the pair of shells for locking the pair of shells and the frame to the pair of posts, and for permitting adjustment of the pair of shells and the frame along the posts;

wherein the pair of shells each include a mating surface for mating with the other shell and a pair of recesses aligned with the pair of recesses of the other shell for collectively retaining the posts therein; and wherein at least one of the recesses has a plurality of flats for receiving the post.

* * * * *